United States Patent Office 2,840,301
Patented June 24, 1958

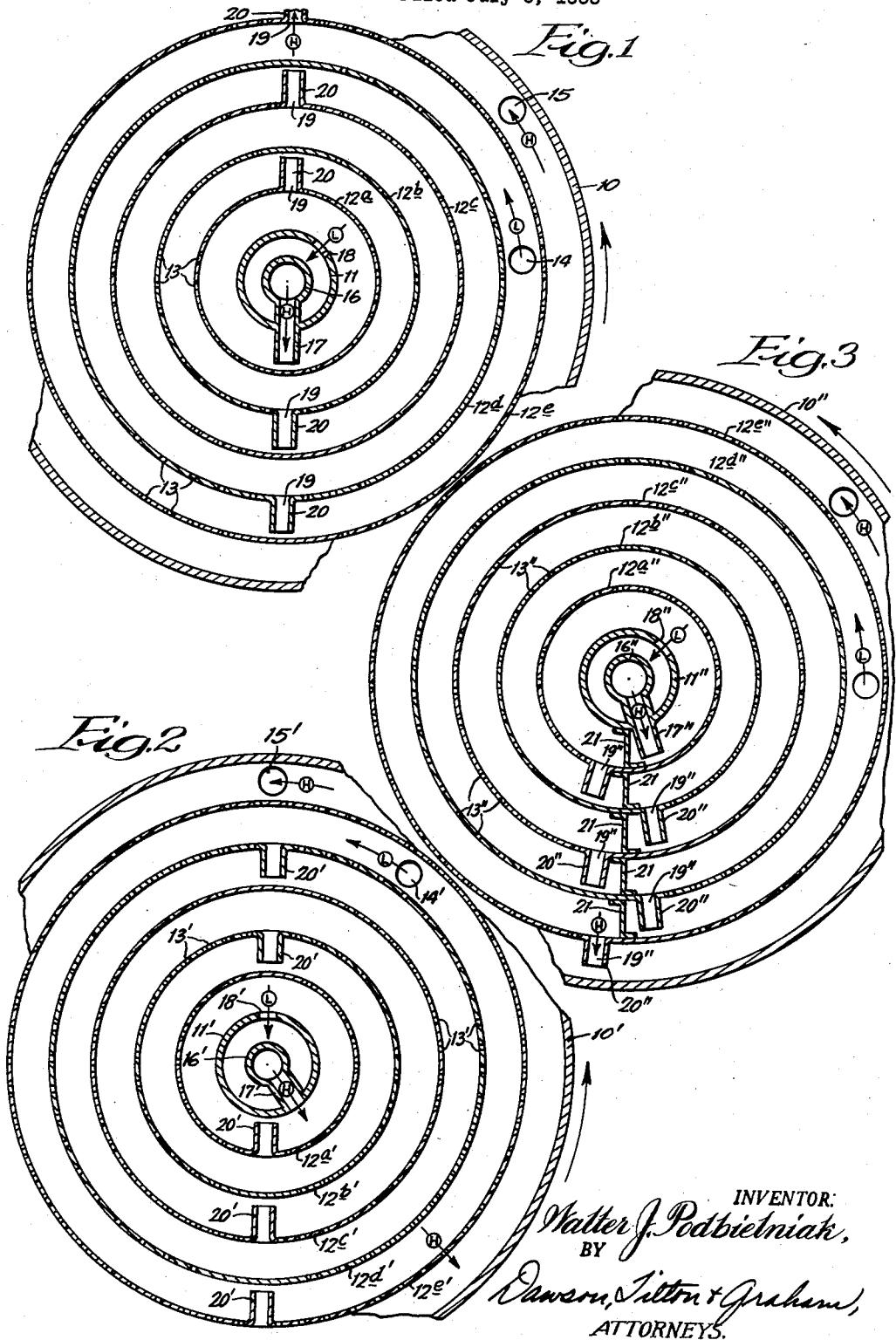

2,840,301

CENTRIFUGAL COUNTER-CURRENT CONTACTING APPARATUS

Walter J. Podbielniak, Chicago, Ill., assignor of one-half to Wladzia G. Podbielniak Application July 6, 1955, Serial No. 520,203

4 Claims. (Cl. 233—15)

This invention relates to a centrifugal countercurrent contacting method and apparatus wherein different phases, including at least one liquid phase, are brought into contact for various purposes. The invention is particularly concerned with the contacting of immiscible liquids of different densities.

The centrifugal counter-current contacting of immiscible liquids and other multi-phase systems has been practiced commercially for a number of years. One apparatus employed for this purpose consists of a hollow casing mounted for rotation on a shaft, the casing containing a plurality of axially-concentric rings or drums which are each perforated around the entire circumference thereof. The heavy phase, usually a liquid which may or may not contain solid material, is introduced at the central portion of the contactor while the contactor is being rotated at high speed. By the centrifugal force thus generated, the heavy liquid is impelled outwardly, flowing from ring to ring through the perforations therein. The light phase, either liquid, gaseous, or both, is simultaneously introduced into the outer portion of the contactor under sufficient pressure to cause it to flow countercurrently to the heavy phase through the ring perforations, both phases being likely to pass through the same perforations. While this counter-current radial flow of the two phases predominates, there is also some circumferential flow in the spaces between the rings, although this circumferential flow is necessarily somewhat haphazard and irregular. When the light phase reaches the central portion of the contactor, it is continually removed at a reduced pressure.

While the contacting method and apparatus just described give remarkable results from many standpoints, they have been found to have some limitations. It has been found that for certain applications a greater capacity and "emulsion handling performance" with a moderate number of stages is required. By "emulsion handling performance" is meant the ability of a contactor to overcome operational difficulties due to the tendency of the phases being contacted to form emulsions. This might be accomplished either by controlling the contacting in such a way as to minimize emulsion formation or by providing for the breaking of emulsions after they are formed, or both.

It is therefore a general object of this invention to provide a centrifugal counter-current contacting method and apparatus which inherently provides a substantially greater capacity and a better emulsion handling performance than the present commercial method and apparatus of the type described above. Another specific object is to provide an apparatus and method of the character described which is adaptable for use with a moderate number of stages, say 3 to 8 stages. Still another object is to provide an apparatus for accomplishing the already designated objects which, at the same time, is solids handling and easily flushed. Further objects and advantages will appear as the specification proceeds.

This invention is shown in illustrative embodiments in the accompanying drawing, in which—

Fig. 1 is a somewhat schematic cross-sectional view of a rotor embodying the present invention and adapted for use in a centrifugal contacting apparatus; Fig. 2, a view similar to that of Fig. 1, showing a modified construction; and Fig. 3, another similar view showing a further modification.

Looking first at Fig. 1, there is schematically illustrated a cross-sectional view of a centrifugal contactor rotor embodying some of the features of the present invention. The hollow outer casing 10 is supported for rotation on a central shaft 11, and inside the casing 10 there is provided a plurality of spaced concentric cylindrical rings or drums 12a—12e. These rings extend between the end walls of the rotor and are attached to the end walls, as shown in my prior Patent No. 2,670,132, thereby providing a plurality of laterally closed passageways. Each of the rings has a plurality of perforations 13 distributed around the entire circumference thereof. Also, near the outer periphery of the contactor, as indicated somewhat schematically at 14, there is provided an inlet for the light fluid, and outwardly of inlet 14, an outlet 15 for the heavy fluid, the light fluid inlet being spaced inwardly of the heavy fluid outlet to provide for final settling and clarification of the heavy fluid. The heavy fluid is shown being supplied through a conduit 16 within shaft 11. The heavy fluid is passed from conduit 16 through an inlet pipe 17, which extends into the passageway between the outer wall of shaft 11 and the innermost concentric ring 12a. In the illustration given, an outlet 18 is shown consisting of a port extending through the outer wall of shaft 11, thereby providing communication between the annular space within shaft 11 around conduit 16 and the annular passageway between ring 12a and shaft 11.

The contactor elements just described are similar to those found in present commercial centrifugal contactors, and their details of construction are well known. Therefore, it is not believed that it will be necessary to describe these elements with greater particularity, or other elements which are commonly associated therewith, such as the means for supplying and removing the light and heavy fluids through the shaft 11, the liquid seals associated with the shaft, the driving means for the shaft, etc. In this connection, specific reference is again made to my prior Patent No. 2,670,132 as disclosing further constructional details.

Still looking at Fig. 1, I wish, however, to call attention to the relatively large ports or orifices 19 which are found in each of the perforated rings 12a—12e. It will be noted that the orifices 19 have a large cross-sectional area as compared to that of the perforations 13. In the illustration given, each of the rings is provided with only a single orifice 19.

Preferably, as illustrated, the orifices 19 are offset with respect to each other in adjacent rings. Where the annular passages between the rings are open and unobstructed, as illustrated in Fig. 1, an approximate 180° offset in the orifices is desirable to provide for a maximum length flow passage between the orifices, irrespective of the direction in which the fluid moves from orifice to orifice. However, additional orifices can be provided where shorter flow passages are desired, as may be the case with the outermost rings of a contactor rotor.

Another important feature of this invention is illustrated in one embodiment in Fig. 1. Specifically, in accordance with this invention, a nozzle 20 is mounted on each of the rings 12a—12e over all of the orifices 19 and arranged to project in the same radial direction from each of the rings into the passageways therebetween. For example, as shown in Fig. 1, the nozzles 20 all extend in a radially outward direction from the rings on which they are mounted. It will also be noted that the nozzles 20 each terminate short of the next adjacent ring in the direction in which they are extending, although extending for well over half the width of the annular passageways.

With the embodiment of Fig. 1, the heavy liquid, which may or may not contain solid material, would be introduced through inlet nozzle 17 into the innermost annular passageway while the contactor was being rapidly rotated. At the same time the light fluid, either liquid or gaseous, would be introduced under pressure at 14 into the outer portion of the contactor. After the contactor passageways have become filled with these fluids and a flow pattern established, it would be found that the flow of the heavy liquid would be primarily circumferential, while the flow of the light liquid would be substantially radial. More specifically, the light liquid would be flowing inwardly from ring to ring through perforations 13, while the heavy liquid would tend to flow around the inner walls of rings 12a—12e and flowing therebetween primarily through orifices 19 and nozzles 20. The heavy liquid being impelled outwardly by centrifugal force will tend to take the path of least resistance, flowing around the inner walls of the rings and then to the relatively large orifices 19 and nozzles 20 instead of through the perforations 13. The pools of light liquid which will be maintained on the outer walls of the rings will also act to retard flow of the heavy liquid through the perforations. The light fluid can not flow through the nozzles 20 or the orifices 19 until the bands of light liquid on the outer walls of the rings reached a depth corresponding to that of the length of the nozzles 20. Thus, over a wide range of flow ratios, the indicated flow patterns can be established and maintained.

Since the heavy liquid in the embodiment of Fig. 1 tends to flow through orifices 19 and nozzles 20 rather than through perforations 13, there will be a reduced tendency for the perforations 13 to become plugged with solid material which is carried in the heavy liquid. This advantage will be particularly marked when the solids are lighter than the heavy liquid and tend to accumulate at the interface between the two liquids. The predominate flow of the light liquid through the perforations to the substantial exclusion of the heavy liquid will tend to wash the solids away from the perforations even if the solids are heavier than the heavy phase.

A related advantage exists with all two-phase systems which tend to form stable emulsions when the phases are simultaneously passed through small perforations, such as perforations 13. The attritional interaction of the fluid phases as they are simultaneously forced through small perforations is largely avoided with the embodiment of Fig. 1. The light phase is passed through the perforations in the concentric rings while the reverse flow of the heavy phase is minimized. At the same time, effective contact is obtained because the light phase as it passes through each ring is dispersed in the circumferentially flowing stream of heavy liquid along the inner walls of the ring. Then the light liquid is allowed to collect and settle along the inner walls of the next ring, thereby providing alternate mixing and clarification without the necessity for passing both liquids through the ring perforations.

When the fluids are present in the contactor in disproportionate volumes, as would result from widely different flow rates of the two fluids, the continuous circumferential versus radial flow pattern of this invention can be advantageous in preventing channelling. For example, in the embodiment of Fig. 1, the heavy fluid could be present in a much larger volume than the light fluid, while still being directed in a continuous generally circumferential flow path from ring to ring. The smaller volume of light liquid could also still have a predominantly radial flow, passing through the perforations 13, and thereby being alternately dispersed and collected as it moves from the outer to the inner portion of the contactor. In order to positively deflect the portions of the heavy phase passing through each nozzle 20 into circumferential paths along the inner walls of the rings it is preferred, as illustrated in Fig. 1, to have the angular ring portions directly opposite the nozzles made imporate.

The embodiment shown in Fig. 2 is substantially the same as that of Fig. 1, except that the nozzles 20' extend radially inward from the concentric rings, instead of radially outward. However, to indicate that Fig. 2 is a modification, as already suggested, the corresponding parts have been given the same numbers with a prime affixed thereto. It will also be understood that with the embodiment of Fig. 2, the heavy liquid will have a predominantly radial flow while the light liquid will have a predominantly circumferential flow. More specifically, the light liquid, after flowing around the outer walls of the perforated rings 12a'—12e' will flow inwardly to the next concentric ring through orifices 19' and nozzles 20', while the heavy liquid will flow outwardly through perforations 13', collecting in bands or pools along the inner walls of the rings to the height of nozzles 20'. This construction might be more advantageous than that of Fig. 1 where the light liquid is present in a much greater volume than the heavy liquid, or where the light liquid has a greater tendency to emulsify in the heavy liquid, when dispersed therein, than does the heavy liquid upon dispersal in the light liquid.

The embodiment of Fig. 3 is also similar to that of Fig. 1, the corresponding parts being the same numbers, the numbers being double primed, to indicate the modification. The principal difference between the constructions of Fig. 1 and Fig. 3 is that in Fig. 3 there are provided obstructions 21 extending across the annular passageways between the rings and arranged to substantially block circumferential flow beyond the nozzles 20" in one circumferential direction. In the illustration given, obstructions 21 are in the form of radially extending plates having laterally turned feet which rest on the adjacent walls of the perforated rings. Preferably, plates 21 extend for the full width and length of the annular passageways, thereby completely preventing circumferential flow in one direction from the nozzles 20" around the annular passageways.

As shown in Fig. 3, the obstructions 21 in radially adjacent passageways are in opposite circumferential relation to the nozzles 20" in the same passageways, thereby blocking the flow beyond the nozzles in opposite circumferential directions for adjacent passageways. With this arrangement, the nozzles in adjacent passageways need only be offset by a distance sufficient to permit the insertion of the obstruction plates 21, as shown in Fig. 3. The flow of the heavy liquid around the inner walls of the perforated rings will then be alternately clockwise and counter-clockwise, irrespective of the direction of rotation of the contactor. If desired, additional nozzles and adjacent obstructions can be provided.

With all three embodiments shown in the drawing, it is assumed that the direction of rotation is counter-clockwise, as illustrated by the rotational arrows on the various figures of the drawing. Assuming a counter-clockwise direction of rotation then, the circumferential flow of the heavy liquid in the embodiment of Fig. 1 and the light liquid in the embodiment of Fig. 2, will be predominantly in the direction of rotation of the contactors due to the so-called "swirl" effect. This will tend to minimize remixing of the collected light phase on the outer walls in the arrangement of Fig. 1, or the collected heavy phase on the inner walls with the arrangement of Fig. 2. On the other hand, with the arrangement of Fig. 3, in alternate passageways where the flow of the heavy liquid is opposite to the direction of rotation of the contactor, there will be a great deal of turbulence and consequent remixing of the light and heavy phases. For example, as shown in Fig. 3, the heavy fluid will be flowing circumferentially in the direction of rotation of the contactor in the innermost annular passageway, and therefore would have a lesser tendency to remix with the collected band of light fluid around the outer wall of shaft 11''. In the next outwardly passageway, the opposite would be the case, and so on.

Generally, the apparatus and method described herein can be employed for counter-current contact between liquid and gages or vapors. For example, the invention can be used in such chemical processing functions as solvent extraction, decolorizing, removing impurities from liquid compositions and chemically interacting two or more liquids. It may also be employed in distillation, reflux extraction, gas absorption, dehumidification, and like processes. However, the use of the invention in carrying out liquid-liquid extractions is particularly advantageous, especially where the particular liquid-liquid extraction has one of the liquid phases in relatively small volume and/or where it is not desirable to disperse both of the liquid phases. For example, the embodiment of Fig. 1 would be particularly useful for extracting a petroleum naphtha solution of unrefined wood rosin with furfural. The naphtha solution of rosin, being the light phase, would be repeatedly dispersed in the continuously flowing stream of furfural, and the furfural would be used at a high volume ratio compared to the naphtha solution of rosin.

As a desirable specific application for the embodiment of Fig. 2 can be mentioned the furfural extraction of degummed soybean oil. Here again, the furfural would be the heavy phase and would be present in much greater volume than the lighter soybean oil. However, this time to promote efficient contact it is desirable to repeatedly disperse and collect the furfural. Therefore, the soybean oil is caused to flow inwardly along circumferential paths while the furfural flows outwardly along radial lines, being dispersed into the flowing stream of soybean oil as it passes through the ring perforations, and then collecting on the inside surface of the next outer ring before passing through the perforations therein.

The sulfuric acid refining of crude gasoline could also be advantageously carried out in the embodiment of Fig. 2. The heavier sulfuric acid could be brought into intimate contact with the crude gasoline, while the gasoline could be present in a much larger volume than the sulfuric acid.

The construction of Fig. 3 provides long circumferential flow paths for the heavy liquid, which are alternately turbulent and relatively smooth. This arrangement would lend itself well to the de-asphalting of residual oil or reduced crudes with propane. The residual oil would move outwardly along the circumferential flow paths, being the heavier phase, while the propane would flow inwardly through the perforations and thereby be dispersed in the residual oil streams adjacent the inside of each ring. Further, within the passageways where the residual oil is flowing in a direction opposite to that in which the contactor is being rotated, both phases will be continually remixed, thereby increasing the effectiveness of the contacting without sacrificing ultimate clarification and separation of the phases. It will be noted that in the outermost and innermost passageways the residual oil will be flowing in the direction of rotation, as indicated in Fig. 3.

While in the foregoing specification this invention has been described in relation to specific embodiments thereof and many details have been set forth for purpose of illustration, it will be apparent to those skilled in the art that the invention is subject to other embodiments and that many of the details can be varied widely without departing from the basic principles of the invention.

I claim:

1. In a centrifugal contact apparatus, a rotor including a plurality of concentric perforated rings providing annular passageways therebetween, said passageways being laterally closed, at least one orifice in each of said rings having a large cross-sectional area compared to that of the perforations therein, and a nozzle mounted on each of said rings over said orifices, said nozzle projecting in only one radial direction from said rings into said passageways but terminating short of the next adjacent ring.

2. The apparatus of claim 1 wherein there is provided obstructions across said passageways positioned adjacent said nozzles and arranged to substantially block circumferential flow beyond said nozzles in one circumferential direction from each of said nozzles.

3. The apparatus of claim 2 which is characterized by the further fact that the obstructions in radially adjacent passageways are in opposite circumferential relation to said nozzles therein to block the flow beyond the nozzles in opposite circumferential directions.

4. The apparatus of claim 1 in which the angular portions of said rings opposite said nozzles are imperforate to assure that the fluid passing through said nozzles is deflected into circumferential paths.

References Cited in the file of this patent

UNITED STATES PATENTS 2,281,796    Podbielniak _____ May 5, 1942